(12) United States Patent
Wang et al.

(10) Patent No.: US 9,650,305 B2
(45) Date of Patent: May 16, 2017

(54) HARD WATER FOAMING AGENTS AND METHODS FOR GYPSUM BOARD PRODUCTION

(75) Inventors: Xuming Wang, Mundelein, IL (US); Steven W. Sucech, Lake Villa, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 1023 days.

(21) Appl. No.: 11/966,749

(22) Filed: Dec. 28, 2007

(65) Prior Publication Data

US 2009/0169864 A1    Jul. 2, 2009

(51) Int. Cl.
*C04B 11/00*    (2006.01)
*B32B 3/26*    (2006.01)
(Continued)

(52) U.S. Cl.
CPC .............. *C04B 38/10* (2013.01); *B32B 13/08* (2013.01); *C04B 24/16* (2013.01); *C04B 2111/0062* (2013.01); *Y10T 428/24999* (2015.04)

(58) Field of Classification Search
CPC . C04B 24/16; C04B 38/10; C04B 2111/0062; C04B 38/08; C04B 22/002; C04B 24/22; C04B 24/2647; C04B 24/38; C04B 28/14; C04B 11/00; C04B 28/02; C04B 38/106; C04B 24/383; C04B 40/0028; C04B 24/124; C04B 40/00; C04B 24/00; C04B 24/02; C04B 24/008; C04B 24/12; C04B 24/20; C04B 103/0093; C04B 40/0071; C08L 91/06; C08L 91/08; C08J 9/00; C08J 9/30; C08F 257/02; C08F 212/08; C08F 236/10; C08F 236/06; C08F 291/00; C11D 1/29; C11D 1/02; (Continued)

(56) References Cited

U.S. PATENT DOCUMENTS 3,782,983 A    1/1974 Komor
3,912,528 A    10/1975 Doan et al.
(Continued)

FOREIGN PATENT DOCUMENTS

EP    0 458 843    12/1991
EP    0 611 734    8/1994
(Continued)

OTHER PUBLICATIONS

Lenntech BV, Calcium (CA) and water. http://www.lenntech.com/periodic/water/calcium/calcium-and-water.htm. Copyright 1998-2009.*
(Continued)

*Primary Examiner* — Hai Vo
(74) *Attorney, Agent, or Firm* — Greer, Burns & Crain, Ltd.; Pradip Sahu; Philip T. Petti

(57) ABSTRACT

Compositions and methods for reducing the impact of hard water on gypsum board foaming are provided. The compositions include adding a foam to water and a calcined slurry. The foam includes water, dispersed air and a surfactant. Surfactants for use include a hydrophobic portion having an alkyl chain length distribution of about 20% to about 60% C8 chains; about 20% to about 60% C10 chains; about 14% to about 36% C12 chains and about 2% to about 20% C14 chains and also having a hydrophilic portion having about 0.2 to 3.0 ethoxy groups.

16 Claims, 14 Drawing Sheets

(51) Int. Cl.
*C04B 38/10* (2006.01)
*B32B 13/08* (2006.01)
*C04B 24/16* (2006.01)
*C04B 111/00* (2006.01)

(58) Field of Classification Search
CPC .......... E21B 21/00; E21B 21/16; E21B 33/13;
E04C 2/043; A62D 1/02; A62D 1/00;
A62D 1/0071; B32B 3/26; B32B 13/14;
B01F 17/0057; Y10S 516/03
USPC .......... 428/319.1, 703, 309.9; 106/781, 678,
106/680, 778, 783, 659, 696, 727, 691,
106/814, 815, 122; 427/372.2; 156/39;
264/40.1, 118, 142; 524/556; 510/451,
510/351, 357, 441, 495, 497, 507, 509,
510/511
See application file for complete search history.

(56) References Cited

U.S. PATENT DOCUMENTS

| | | | |
|---|---|---|---|
| 3,926,650 A | 12/1975 | Lange et al. | |
| 4,046,582 A | 9/1977 | Kawamura et al. | |
| 4,113,638 A | 9/1978 | Taylor | |
| 4,156,615 A | 5/1979 | Cukier | |
| 4,188,311 A | 2/1980 | Aalbers et al. | |
| 4,229,223 A * | 10/1980 | Flake | 521/55 |
| 4,249,948 A | 2/1981 | Okada et al. | |
| 4,453,022 A | 6/1984 | McCain et al. | |
| 4,585,645 A | 4/1986 | Sucech | |
| 4,618,370 A | 10/1986 | Green et al. | |
| 4,676,835 A | 6/1987 | Green et al. | |
| 4,678,515 A * | 7/1987 | Green et al. | 106/678 |
| 4,770,869 A | 9/1988 | Misra et al. | |
| 5,085,929 A | 2/1992 | Bruce et al. | |
| 5,141,734 A | 8/1992 | Misra et al. | |
| 5,149,520 A | 9/1992 | Sucech et al. | |
| 5,158,612 A * | 10/1992 | Savoly et al. | 106/678 |
| 5,240,639 A * | 8/1993 | Diez et al. | 516/14 |
| 5,336,480 A | 8/1994 | Misra et al. | |
| 5,466,393 A | 11/1995 | Diez et al. | |
| 5,595,596 A | 1/1997 | Marcotullio et al. | |
| 5,643,510 A * | 7/1997 | Sucech | 264/40.1 |
| 5,683,635 A | 11/1997 | Sucech et al. | |
| 5,714,001 A | 2/1998 | Savoly et al. | |
| 6,220,354 B1 * | 4/2001 | Chatterji et al. | 166/293 |
| 6,342,284 B1 | 1/2002 | Yu et al. | |
| 6,443,258 B1 * | 9/2002 | Putt et al. | 181/294 |
| 6,777,517 B1 | 8/2004 | Albrecht et al. | |
| 6,869,998 B2 * | 3/2005 | Bair et al. | 524/556 |
| 7,033,431 B2 | 4/2006 | Martin et al. | |
| 7,191,834 B2 | 3/2007 | Lewis et al. | |
| 2003/0188670 A1 * | 10/2003 | Martin et al. | 106/781 |
| 2005/0106118 A1 | 5/2005 | Sakuma et al. | |
| 2006/0278129 A1 | 12/2006 | Liu et al. | |
| 2006/0278130 A1 | 12/2006 | Liu et al. | |
| 2008/0081771 A1 * | 4/2008 | Lin et al. | 507/202 |

FOREIGN PATENT DOCUMENTS

| | | |
|---|---|---|
| EP | 611734 A1 * | 8/1994 |
| EP | 0 810 920 | 12/1997 |
| JP | H03023508 | 3/1991 |
| JP | H06239676 | 8/1994 |
| WO | 99/35103 | 7/1999 |
| WO | 2006/138280 | 12/2006 |
| WO | 2006138289 | 12/2006 |

OTHER PUBLICATIONS

Water Research Center, Hard Water Hardness Calcium Magnesium Water Corrosion Mineral Scale, copyright 2014, Water Research Watershed Center, pp. 1-7.*
Stepan Product Bulletin, CEDEPAL FA-406, Sep. 2005, pp. 1-2.
Stepan, CEDEPAL FA-403 overview, 2012, pp. 1-2.
"Product Bulletin: STEOL CA-330", Apr. 1, 2010 (Apr. 1, 2010), pp. 1-2, XP55086714, Illinois USA, URL:http://www.stepan.com/pdfs/Bulletins/STEOLCA330.pdf.
Decision to grant a European patent pursuant to Article 97(1) EPC for European Patent Application No. 08868770.2.
Allowed EP Claims for European Patent Application No. 08868770.2.
Certificate of Patent for Japanese Patent No. 5678304.
JPO Action (in English and Japanese) from counterpart Japanese Patent Application No. 2010-540760, dated Mar. 26, 2013.
Summons to Attend Oral Proceedings Pursuant to Rule 115(1) EPC, European Patent Office, Jan. 18, 2017.
Holleman A., "Lehrbuch der anorganischen Chemie", Textbook of Inorganic Chemistry, 1995.
Rompp Lexicon, "Harte des Wassers", Chemistry, 1997.
"Total Water Hardness", Water Quality with Vernier, Computer 14, pp. 14-1-14-6.
"USGS Water-Quality Information: Water Hardness and Alkalinity", USGS Science for a Changing World, Sep. 13, 2016, pp. 1-3.

* cited by examiner

HARD WATER FOAMING AGENTS AND METHODS FOR GYPSUM BOARD PRODUCTION

BACKGROUND OF THE INVENTION

The present invention relates to a composition and method for improved gypsum panel foaming. More particularly, the present invention relates to an additive and methods for using an additive for improved gypsum panel foaming. Even more particularly, the present invention relates to compositions and methods utilizing an additive to reduce the impact of hard water on gypsum panel foaming.

Gypsum panels, often referred to as gypsum boards, drywall, wallboard or plasterboard, are typically manufactured by utilizing a faced wall board as used in dry wall construction. A pre-generated foam is added to the panel slurry mix; the foam is generated from a mixture of a foaming agent, air and water in a suitable foam generating apparatus. The foamed gypsum slurry is then deposited onto a moving paper or other substrate supported on a long moving belt. A second substrate may be applied on top of the slurry to constitute the second face of the gypsum board. Next, the sandwich passes through a forming station which determines the width and thickness of the gypsum board. In continuous operation, the gypsum slurry begins to set immediately after the board is formed. Subsequently, the board is cut, dried and bundled into commercially acceptable lengths.

Water mixed to form the foam of the foamed gypsum slurry can vary in hardness. Hard water is typically defined as water that has a relatively high mineral content. In contrast, soft water contains little or no minerals. The content levels typically consist of higher levels of calcium and magnesium metal ions in the form of carbonates, but may include several other metals as well as bicarbonates and sulfates. Descriptions of the hardness of water correspond roughly with the ranges of mineral concentrations:

| Hardness | Mg/L as calcium |
|---|---|
| Soft | 0-20 |
| Moderately Soft | 20-40 |
| Slightly hard | 40-60 |
| Moderately hard | 60-80 |
| Hard | 80-120 |
| Very Hard | >120 |

The use of hard water within the foam of the gypsum slurry leads to low volumes of foam produced and board defects related to unwanted coalescence of foam cells once the gypsum is set. In some instances, controlled coalescence to create relatively large foam cells are desired within the foam. In most instances, however, the use of hard water results in unpredictable foaming which can limit line speeds and results in foam cell voids that are much larger than desired. These large foam voids can translate to recovery and/or quality issues, including a reduction in the strength or integrity of the wallboard.

Short term stability of foam added to a gypsum slurry is important in gypsum panel production. Control of this stability controls board core bubble size and impacts gypsum panel strength. To control foam stability, soap compositions can be selected or a foam system blending a binary mixture of soap can be used to increase bubble sizes and strength. It has been determined that a larger bubble size provides greater strength to the finished gypsum panel than smaller bubble sizes. However, excessively large bubble sizes can be detrimental to the quality of the panel. For this reason, it is important when developing a surfactant to take into account other factors which may affect the bubble size in addition to existing soap blends or a foam system to produce blends of stable and unstable soaps to create a foam surfactant. For example, process water can also affect foam stability and in some cases produce a board core with excessively large foam voids, such is the case in the presence of hard water. The present invention provides a composition and methods for using a surfactant composition which provides increased stability and control to the gypsum slurry over a wider range of process conditions. The compositions in accordance with the teachings of the present invention have potential to increase line speed and/or lower board cost during manufacture.

Compositions contemplated for use in embodiments of the invention maximize air entrainment and minimize usage in gypsum panel slurries. In one embodiment, the composition is a surfactant. In other embodiments, the composition is a blend of soaps, including stable soaps, unstable soaps and mixtures thereof. An unstable soap refers to a surfactant of a foaming agent which may produce copious volumes of foam and becomes unstable upon contact with the gypsum slurries. A stable soap refers to a soap developed to maximize air entrainment and minimize usage in gypsum board slurries. Compositions utilizing blends of the stable and the unstable soaps are known, such as in U.S. Pat. No. 5,643,510 issued to Sucech, incorporated herein by reference, which blends compositions of the stable and the unstable soaps for a desired bubble size and shape.

In some cases, other ingredients in the gypsum slurries can cause excessively large voids. For example, the use of hard water as process water can give rise to an excessively large foam core bubble size and soap adjustments (even to 100% stable soap), which are unable to reduce core bubble size to optimum levels. Thus, there are instances in which simply using more of the stable foaming agents (such as surfactants) will not be sufficient to adjust the bubble size. To establish quality and control, productions lines may be resort to slower speed, reformulation and/or higher board manufacturing costs.

BRIEF SUMMARY OF THE INVENTION

In accordance with one embodiment, a gypsum slurry with a stable foam in the presence of hard water having a minimum of about 40 mg/L calcium is provided. The gypsum slurry is formed from a calcined gypsum and water. A foam is added to the gypsum slurry. The foam includes water, dispersed air and a surfactant, where the surfactant is made of a distribution of varying alkyl chain lengths including about 20% to about 60% C8 chains; about 20% to about 60% C10 chains; about 14% to about 36% C12 chains and about 2% to about 20% C14 chains in the hydrophobic portion and a hydrophilic portion having about 0.2 to 3.0 ethoxy groups.

In accordance with an embodiment of the invention, a composition for stabilizing foam in a gypsum slurry in the presence of hard water is provided. The composition includes an alkyl ethoxy sulfate. The alkyl ethoxy sulfate has a hydrophilic portion including about 0.2 to about 3.0 ethoxy groups. The alkyl ethoxy sulfate also has a hydrophobic portion including a distribution of alkyl chain lengths including about 20% to about 60% C8 chains, about 20% to about 60% C10 chains, about 14% to about 36% C12 chains and about 2% to about 20% C14 chains.

In accordance with another embodiment of the invention, a method for forming a gypsum slurry in the presence of hard water is provided. The method includes mixing a calcined gypsum with water to form a gypsum slurry. A foam is then added, where the foam has stability is hard water. The foam includes water, air and a surfactant. It is contemplated that the calcined gypsum may be mixed with hard water or that the foam may include hard water or that both instances will include hard water. The surfactant includes a hydrophilic portion including about 0.2 to about 3.0 ethoxy groups. The surfactant also includes a hydrophobic portion including a distribution of alkyl chain lengths including about 20% to about 60% C8 chains, about 20% to about 60% C10 chains, about 14% to about 36% C12 chains and about 2% to about 20% C14 chains.

In accordance with still another embodiment of the present invention, a gypsum panel formed in the presence of hard water is provided. The gypsum panel includes a calcined gypsum and water to be mixed with the calcined gypsum to form a gypsum slurry. A foam is added to the gypsum slurry. The foam, which is stable in the presence of hard water, is formed by combining water, air and a surfactant. A hydrophilic portion of the surfactant is provided and includes about 0.2 to about 3.0 ethoxy groups. The surfactant also includes a hydrophobic portion that has a distribution of alkyl chain lengths including about 20% to about 60% C8 chains, about 20% to about 60% C10 chains, about 14% to about 36% C12 chains and about 2% to about 20% C14 chains. A front face and a back face are also included in the gypsum panel. The foamed gypsum slurry is allowed to set between each of the front and back faces. Once set, the gypsum panel can be processed for finishing.

DETAILED DESCRIPTION OF THE INVENTION

Figure 1:
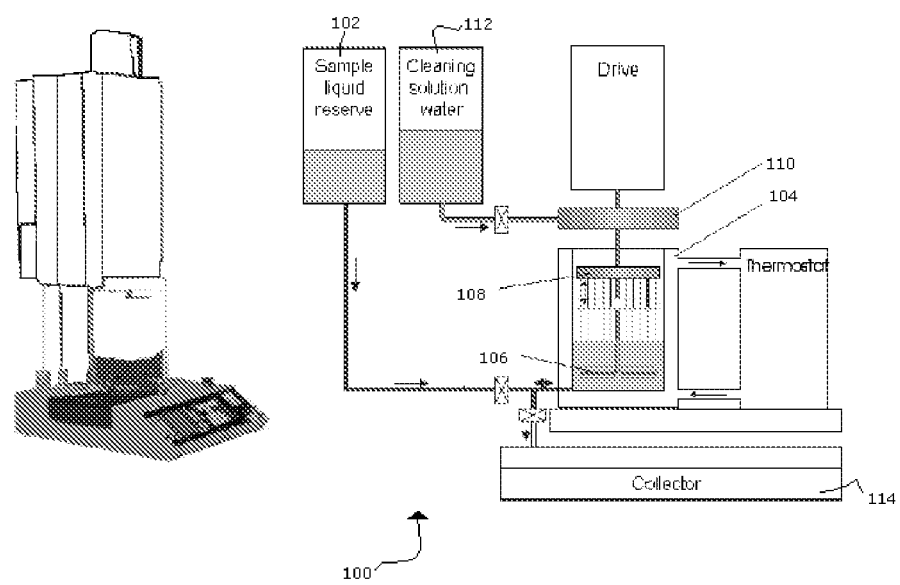
FIG. 1 illustrates a SITA foam tester utilized for foam testing in accordance with an embodiment of the invention.

It is thus contemplated by embodiments of the present invention to mix an additive, such as a foaming agent or surfactant, into a foam having excessively large voids to provide stability to the foam by reducing the number and size of the voids to a desired amount. It is further contemplated that the foam stability in the presence of hard water is applicable in any number of applications, including gypsum boards, gypsum panels, drywall, wallboard or plasterboard for a number of different uses including drywall and ceiling tile. It is also contemplated that the hard water may be present in the gypsum slurry or in the foam or in both. Other applications of the present invention include those that would be appreciated by those of ordinary skill of art.

Liquid foams are made wherever gases and liquids are mixed. Three elements are needed to form liquid foams, including a liquid, which is typically soft water, distributed air or gas, which may be added using an air/foam generator, usually from a foam generator, and a surfactant, such as soap. A stable foam is formed as surfactant molecules adsorption on a liquid/air interface. The packing state of the molecules contributes to the stability of the foam. Indeed, there are many factors that cause instability of the foam, including, but not limited to, drainage, coarsening and film rupture. Drainage will typically occur into the Plateau border channels until an equilibrium state is reached. Coarsening occurs when gas diffuses through bubbles and some bubbles grow larger while other bubbles tend to shrink and disappear. The net result of this process is that the average bubble size becomes larger (grows) over time. In addition, film rupture can occur when the foam film (structure) gets too thin and weak. The foam is thus susceptible to collapsing and thereby vanishing with the wash.

When surfactant molecules collect at that the water/air interface, however, the water surface tension will typically be reduced. Pure water surface tension is typically about 72 mN/m. The ability of a surfactant to perform as a foaming agent depends in part on its effectiveness at reducing the surface tension of the solution. A lower surface tension typically produces smaller and more uniform bubbles. The surface tension measurement of mixing two soaps typically results in that the combination of soaps will typically have a lower surface tension than does the single soap solution. When compositions in accordance with the present invention include blends of stable and unstable soaps, ratios of the stable soap to the unstable soap including 9:1, 4:1, 3:1 and 2.3:1 are contemplated for use with embodiments of the present invention.

In certain instances, however, for example with ammonium laureth sulfate (Steol CA-330), from Stepan Company, there is a point where the surface tension does not significantly change. Ammonium laureth sulfate as used herein consists of both C12 and C14 alkyl chain lengths at the hydrophobic portion and 3 ethoxy groups at the hydrophilic portion. The ratio within the ammonium laureth sulfate is about 80% C12 chain lengths and about 20% C14 chain lengths. The concentration of stock CA-330 soap used herein is about 28%. Since the surface tension does not change significantly, the ability of ammonium laureth sulfate to act as a surfactant or foaming agent also decreases after an increase in the amount per weight. In the example of ammonium laureth sulfate, following an increase of about 40%, there is very little change in the surface tension.

In one embodiment, it is desired to utilize a composition that includes a blend of both the stable and the unstable soap. Although a blend of soaps is described hereto, it is to be understood that one soap may be used having a similar alkyl chain length distribution as the blends of soaps described. Additionally and alternatively, it is contemplated that more than two soaps may be blended together to achieve the desired alkyl chain length distribution. The current stable soaps used in production of gypsum board are typically characterized by having a soap composition with a relatively narrow alkyl chain length of about C8-C10 or C10-C12 and an ethoxy chain length of about 0.2 to 3.5.

Examples include Hyonic PFM from Geo Specialty Chemicals, FA 403 from Stepan Chemicals or Thatcher TF from Thatcher Chemical company. In the process of determining the desired bubble size, these soaps are preferably blended with a C10-C12 alkyl sulfate with zero ethoxy groups (the unstable soap in the gypsum slurry). This blending operation typically produces the soap and the resulting foam which becomes unstable in the gypsum slurries and the foam coalesces to produce relatively larger bubbles in the gypsum panel core and increases the panel strength.

When the gypsum slurry is made in the presence of hard process water, the foam typically produces excessively large bubbles. Further, the foam resists attempts to reduce the bubble size with the addition of components that tend to make foams more stable, such as stable surfactants in the foaming agent. Therefore, it is desired to reduce the bubble size of foam made with hard process water while using a blend of soaps to vary the bubble size. A balance between the large bubble size and the smaller bubble size is desired for the physical properties of the finished gypsum panel product.

In accordance with an embodiment of the present invention, the addition of a C12-C14 alkyl-ether sulfate with an average ethoxy chain length of three has been found to stabilize foam even in the presence of hard water. For purposes of this application only, the phrase "stabilize the foam" refers to the reduction of excessively large voids in the gypsum slurry as a result of the hard water in the slurry mixture. It is also contemplated that hard water may be utilized only in the foam water. Additionally and alternatively, it is contemplated that hard water may present in both the slurry mixture and the foam water in any combination as would be appreciated by those skilled in the art. The addition of the C12-C14 alkyl-ether sulfate additive balances the excessively large voids. This additive can be used in amounts of about 40% and higher based on the total weight of the foaming agents.

In accordance with the present invention, compositions to stabilize foam in the presence of hard water include a hydrophobic portion and a hydrophilic portion. These compositions affect foam generation as well as foam decay. The hydrophilic portion includes about 0.2 to 3.5 ethoxy groups and more preferably 2.5 to 3.0 ethoxy groups. The hydrophilic portion of the composition provides good solubility of the composition. Compositions in accordance with the present invention also preferably include a hydrophobic portion, which will typically include a distribution of alkyl chain lengths. The hydrophobic portion of the composition provides good stabilization. As described above, a number of alkyl chain lengths are described in the soaps and blends of soaps provide a distribution of alkyl chain lengths. It is also contemplated that a distribution of alkyl chain lengths can be achieved without blending soaps.

Other gypsum slurry additives, such as starches, polycarboxylate ether dispersants or naphthelene sulfonate, also impact the gypsum board foaming and produce larger foam core bubbles. In some cases, the foamed core bubble size is excessively large and the soap composition must be adjusted to reduce the bubble size for optimum gypsum board processing and quality.

In accordance with embodiments of the present invention, the addition of a C12-C14 alkyl-ether sulfate with an average ethoxy chain length of three (such as Steol CA 460 soap and CA 330 soap from Stepan Chemicals in which the alkyl chain is approximately 80% C12) effectively stabilize foaming in hard water. CA 460 soap as used herein consists of both C12 and C14 alkyl chain lengths at the hydrophobic portion and 3 ethoxy groups at the hydrophilic portion. The ratio within the CA 460 soap is about 80% C12 chain lengths and about 20% C14 chain lengths. The concentration of stock CA 460 soap used herein is about 60%. The improved stability typically increases with addition levels up to about 35% of the C12-C14 alkyl-ether sulfate. Above about 40% addition of the C12-C14 alkyl-ether sulfate, it has been observed that the stability in the presence of hard water diminishes.

In accordance with an embodiment of the present invention, a method is provided for forming a gypsum slurry in the presence of hard water. The method includes mixing a calcined gypsum with water to form a gypsum slurry. It is contemplated that in certain embodiments of the invention, the water used to mix with the calcined gypsum may be hard water.

Once the gypsum slurry is formed, foam is added to the gypsum slurry. The foam added preferably is stable in the presence of hard water. The foam itself is formed by combining water, air and a surfactant. It is contemplated that in certain embodiments of the invention, the water used to form the foam may be hard water. The foam itself can be created as would conventional foam as would be appreciated by those skilled in the art. The surfactant used, however, will vary in accordance with the present invention. Surfactants, or alkyl ethoxy sulfates, for use in accordance with the present invention preferably include a hydrophilic portion and a hydrophobic portion. While the hydrophilic portion provides good solubility, the hydrophobic portion provides good stabilization.

Thus, utilizing a hydrophilic portion having good solubility is preferred. For example, the use of about about 0.2 to 3.5 ethoxy groups and more preferably 2.5 to 3.0 ethoxy groups has been shown to provide the desired solubility. In addition, the use of a distribution of alkyl chain lengths in the hydrophobic portion of the surfactant has been shown to provide good stability. For example, it has been determined that surfactants including distributions of alkyl chain lengths of C8, C10, C12 and C14 are preferred. More particularly, about 10% to about 80% C8 chains; about 10% to about 80% C10 chains; about 10% to about 40% C12 chains and about 2% to about 15% C14 chains. Preferably, an alkyl distribution for surfactants in accordance with the present invention include about 20% to about 60% C8 chains; about 20% to about 60% C10 chains; about 14% to about 36% C12 chains and about 2% to about 20% C14 chains.

It is contemplated that surfactants in accordance with the present invention may be pre-blended and may be the result of blending two or more previously existing soaps. It is also contemplated that the surfactants in accordance with the present invention may be formed without blending existing soaps, but by manufacturing the specific soap needed. This may depend on the application of the surfactant as would be appreciated by those skilled in the art.

It is also contemplated that when forming the gypsum slurry as described above, an additive may be mixed. Additives to be used in accordance with the present invention preferably assist in forming larger foam core bubbles. It is contemplated, however, that any additive may be used as would be appreciated by those skilled in the art. Preferable additives include starches, polycarboxylate ether dispersants, naphthalene sulfonate and mixtures thereof.

Once the foam has been stabilized within the gypsum slurry, it is contemplated that a gypsum panel may be formed by placing a front facing paper and a back facing paper and then finished as would be known by those of ordinary skill.

Example 1

Tests examining foam stability were conducted with de-ionized water and water obtained from a "hard" water source. The hard water source in this instance was pumped from a gypsum mine and was saturated with calcium and sulfate. An analysis of the water is shown below in Table 1:

TABLE 1

| Sample | F− | Cl− | NO3− | SO4−2 | Na+ | K+ | Mg+2 | Ca+2 | TOC | pH |
|---|---|---|---|---|---|---|---|---|---|---|
| Hard Water | 1.0 | 39.8 | 7.3 | 1780.1 | 27.0 | 2.5 | 57.7 | 376.0 | 83 | 7.53 |
| De-ionized Water | | 0.7 | | 2.3 | <1 | | | 4.3 | | 7.12 |

Testing was conducted using a SITA foam tester in which soaps and soap blends were mixed with de-ionized water or the hard water sample. With the SITA foam tester, as shown in FIG. 1, the amount of foam generated with increasing agitation can be measured. Once fully agitated, foam volume measurements continue and foam decay is measured. Using both foam generation and decay measurements, performance of soaps and soap blends can be determined.

As FIG. 1 demonstrates, the SITA tester 100 utilizes a sample liquid in found in the sample liquid reserve 102. The sample liquid enters into the double wall sampling vessel 104, which includes a thermostat. Once inside the sampling vessel 104, the rotor 106 will activate in order to begin foam generation. The amount of foam being generated is measured by the sensor unit 108, which preferably includes needle detectors. Following the generation of foam, foam decay is measured utilizing the same sensor unit 108. A spray ring 110 automatically cleans the sampling vessel 104 utilizing a cleaning solution/water from the cleaning solution/water vessel 112. Once cleaned, the cleaning solution/water is collected at the bottom of the foam tester in the collector 114.

The surface tension of soap and mixtures thereof in both de-ionized water and the hard water sample were also measured using a Kruss Tensiometer Model K12 Mk6. Other means for testing the surface tension may be used as would be appreciated by those skilled in the art. A decrease in surface tension correlates to an improvement in foaming.

The additives were compared and analyzed for their ability to stabilize foam in the presence of hard water. The soaps and additives utilized included: Hyonic PFM-33 soap (Ethoxylated sulfate, ammonium salts, alcohols), from Geo Specialty Chemicals, Inc.; Steol CA-460 soap, 60% solids (ammonium laureth sulfate, 3 ethoxy groups), from Stepan Company; Steol CA-330 soap, 28% solids (ammonium laureth sulfate, 3 ethoxy groups), from Stepan Company; and Aromox C/12-W soap (dihydroxyethyl cocamine oxide), from Akzo Nobel.

PFM-33 soap is a stable soap for purposes of the present application. PFM-33 soap includes C6 to C12 alkyl chain lengths. The PFM-33 soap solution used herein is provided for in about a 33% concentration solution. Soap blends in this example were prepared by adding soap stabilizers (Steol CA-460 soap; Steol CA-330 soap and Aromox C/12-W soap) to make a resulting soap with about 10%, 20% and 30% concentration of the stabilizer. Soap solutions for use in the present example were prepared by blending 0.4 grams of soap with 800 grams of water (either de-ionized water or the hard water sample), which was then added to the SITA tester.

Figure 2:
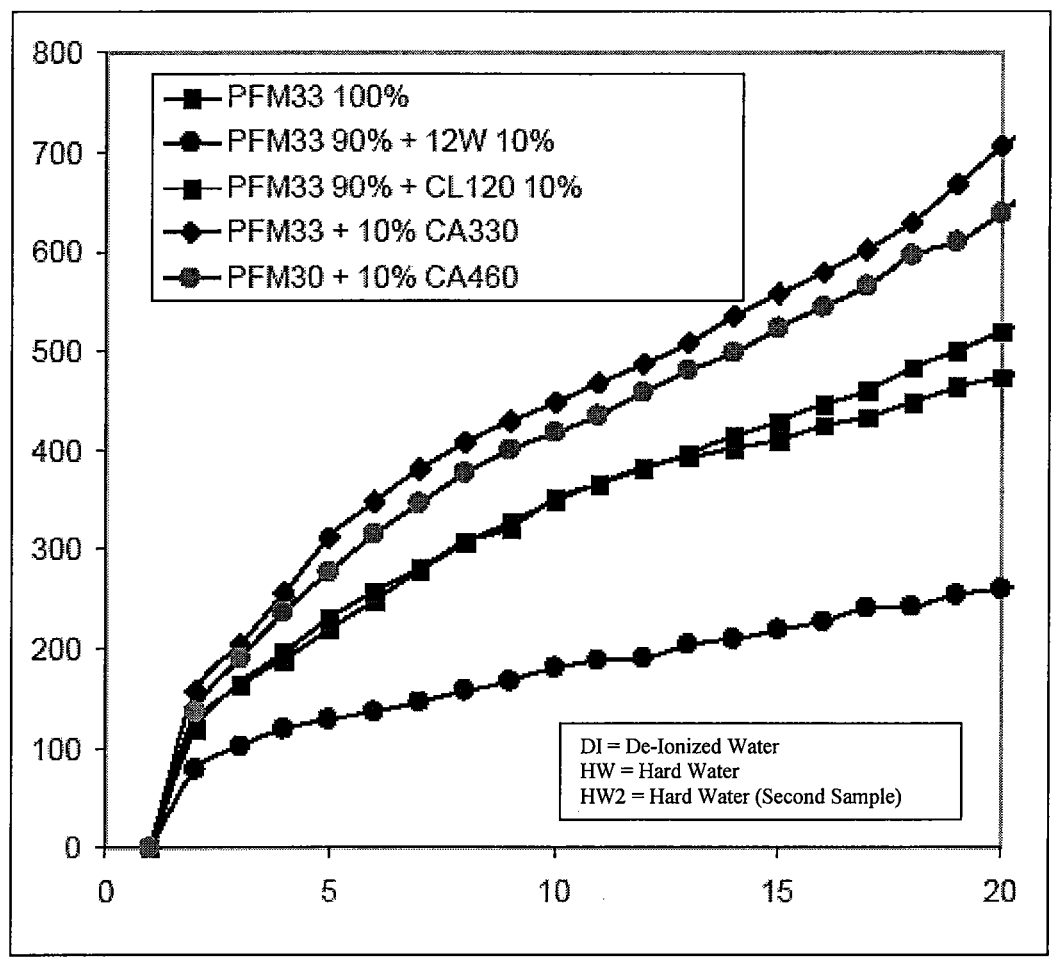
FIG. 2 illustrates the foam test results using the SITA tester of FIG. 1 in accordance with an embodiment of the invention.

With the SITA tester, both foam generation and foam decay were measured. The results from the foam generation tests are shown in FIG. 2. CA-330 soap and CA-460 soap showed significantly increased foam generation in the hard water sample as compared to the PFM-33 soap or other soap mixtures. CA-330 soap and CA-460 soap are similar soaps that differ primarily in the percent solid content (concentration). Based on the higher foam generation, further testing concentrated on soap blends with CA-330 soap and CA-460 soap. The foam decay tests of FIG. 2 utilized the following combinations:

TABLE 2

| Solution | PFM-33 | De-Ionized Water | Hard Water |
|---|---|---|---|
| Water | 0 | | |
| CA 0% | 100% | No | Yes |
| 10% Aromox C/12-W | 90% | No | Yes |
| 10% CL 120 | 90% | No | Yes |
| 10% CA-330 | 90% | No | Yes |
| 10% CA-460 | 90% | No | Yes |

Figure 4:
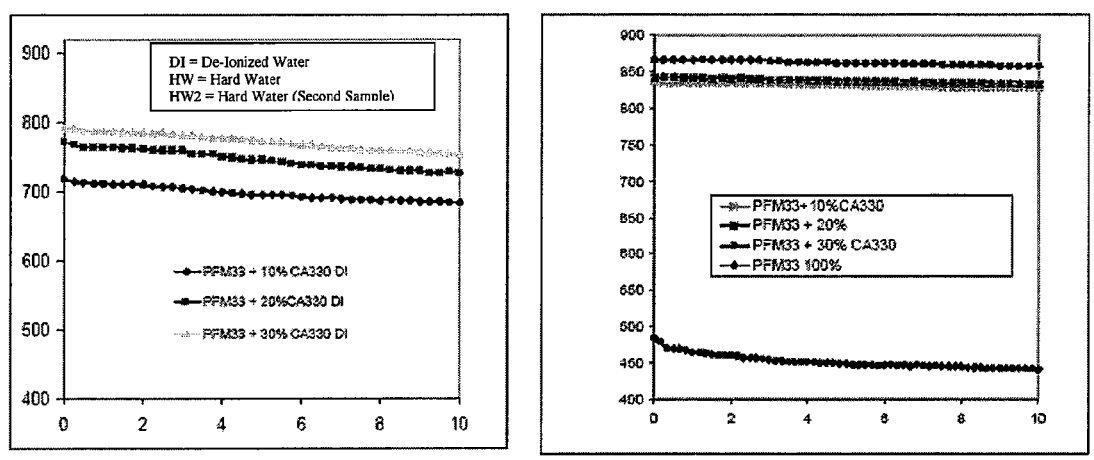
FIG. 4 illustrates foam decay curves for stabilizers in de-ionized water and hard water samples in accordance with an embodiment of the invention.

Foam volume generated with the stabilizer additive in hard water sample is higher than without the stabilizer additive. Foam decay results are shown in FIG. 4, with particular emphasis in foam breakdown within the first minute of measurement.

Figure 3:
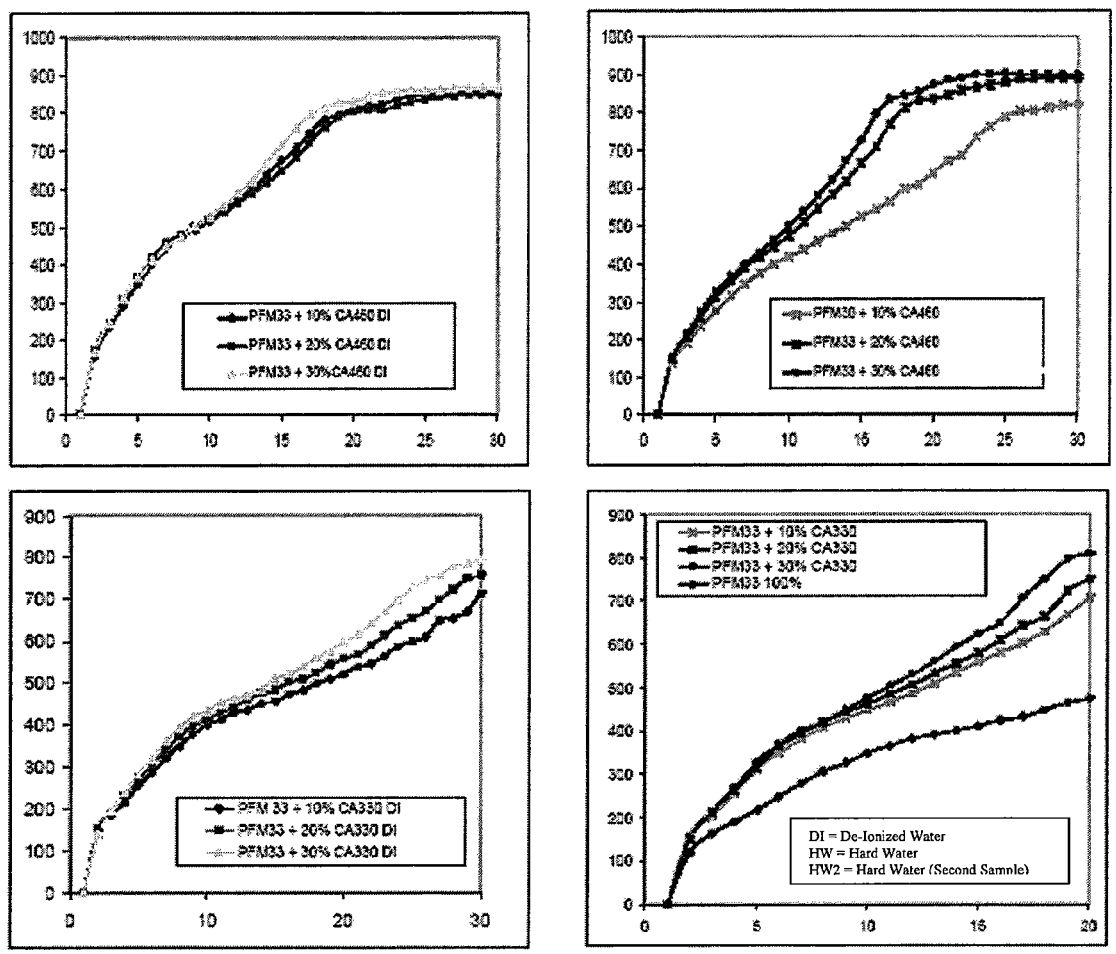
FIG. 3 illustrates foam generation test results for soap blends in de-ionized water and hard water samples in accordance with an embodiment of the invention.

Surface tension measurements are shown below in Table 3. Foam generation results for CA-460 soap and CA-330 soap blends at about 10%, 20% and 30% concentrations in de-ionized and hard water samples are shown in FIG. 3. As shown, surface tension is minimized around about 20% soap stabilizer to PFM-33 soap. The maximum soap stability corresponds with the lowest surface tension. Based on this result, soaps containing about 20% stabilizer additive should perform best in hard water conditions.

TABLE 3

| Solution | PFM-33 | De-Ionized Water | Hard Water |
|---|---|---|---|
| Water | 0 | 71.6 | 71.46 |
| CA 0% | 100% | 37.17 | 34.5 |
| 10% CA-330n | 90% | 35.14 | 31.24 |
| 20% CA-330n | 80% | 33.75 | 31.66 |
| 30% CA-330n | 70% | 39.18 | 31.78 |
| Water | 0 | 71.69 | 71.88 |
| 10% CA-460 | 90% | 31.48 | 29.76 |
| 20% CA-460 | 80% | 29.36 | 29.54 |
| 30% CA-460 | 70% | 29.65 | 30.22 |

Example 2

A second trial was set up for the hard water sample using CA-330 soap with a current stable soap (FA-403 soap). The FA-403 soap includes both C8 and C10 alkyl chain lengths for the hydrophobic portion of the composition, having about 40% C8 chain lengths and about 60% C10 chain lengths. CA-330 soap was utilized since it has percent solids that are similar to other soaps typically used in plants. A blend of CA-460 soap with soaps typically used in plants forms a gel upon mixing the soap unless alcohol is added to prevent gel formation. It is to be understood that even though the present examples are described as blends of soaps, a single soap having a similar alkyl chain length distribution can be used. Even in instances where sufficient alcohol was added, the potential for gel formation exists upon contact with other soap having specific bubble sizes during processing.

Soaps for trials were prepared one day prior to the testing. Three 20 pound batches of soap were, for example, blended with a CA-330 soap concentration of about 10%, 20% and 30%.

The trial was conducted on ½" SHEETROCK® brand building panels. At the beginning, the plant was running at a 50% blend of soaps (50% FA-403 soap and 50% Polystep B25 soap). The Polystep B25 soap composition contains both C10 and C12 alkyl chain lengths. More particularly, the Polystep B25 soap composition includes about 90% C10 chain lengths and about 10% C12 chain lengths. The Polystep B25 soap composition used herein was about a 38% concentration composition. For this trial, there were no changes to the operating conditions or formulation. FA-403 soap in the mixture was replaced with the test soap. The soaps tested included:

TABLE 4

| | % FA-403 | % Polystep B25 | Concentration of CA-330 |
|---|---|---|---|
| Control | 50 | 50 | 0 |
| Trial 1 | 90 | 0 | 10 |
| Trial 2 | 80 | 0 | 20 |
| Trial 3 | 70 | 0 | 30 |

Switching of soaps for each condition had no noticeable effect on operation. Slumps were taken to monitor the core bubble size during the trial.

Figure 5:
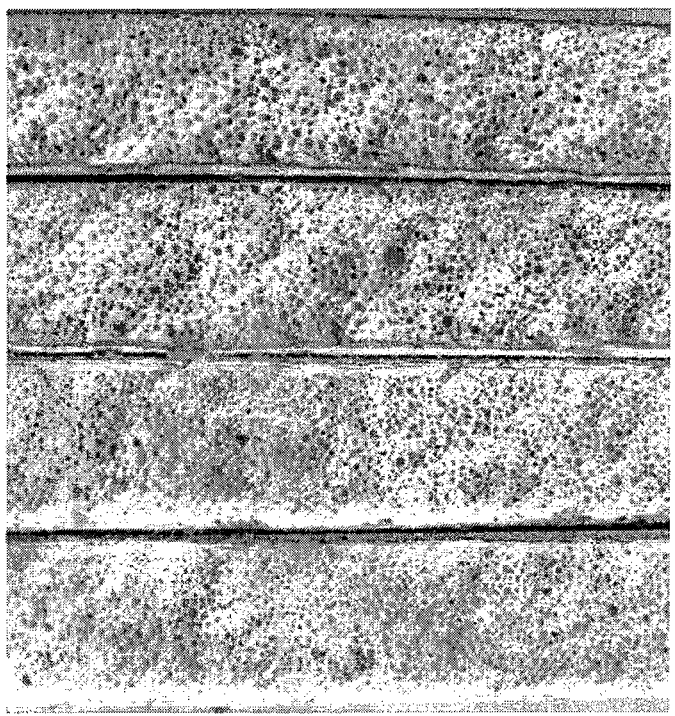
FIG. 5 shows board core samples showing the impact of soap stabilizers on resulting foam bubble size in accordance with an embodiment of the invention.

Naphthalene sulfonate (a dispersant), gypset starch and soap blends of specified bubble size can all be used in the formulation to increase core bubble size (even in plants where water is not an issue). Since the trial was aimed at reducing or eliminating the impact of hard water on foam stability, a best decrease in bubble size with the addition of the foam stabilizer additive was desired. As the percentage of stabilizing soap increased, the core bubble size decreased. The bubble size in the board samples are pictured in FIG. 5. To measure the average bubble size and size distribution, a Clemex Vision Image Analyzer was used, as set forth in Table 5:

TABLE 5

| Sample | % FA-403 | % CA-330 | Average Air Void Size |
|---|---|---|---|
| Control | 100 | 0 | 0.68 |
| Trial 1C | 95 | 5 | 0.55 |
| Trial 2C | 90 | 10 | 0.51 |
| Trial 3C | 85 | 15 | 0.46 |

Figure 6:
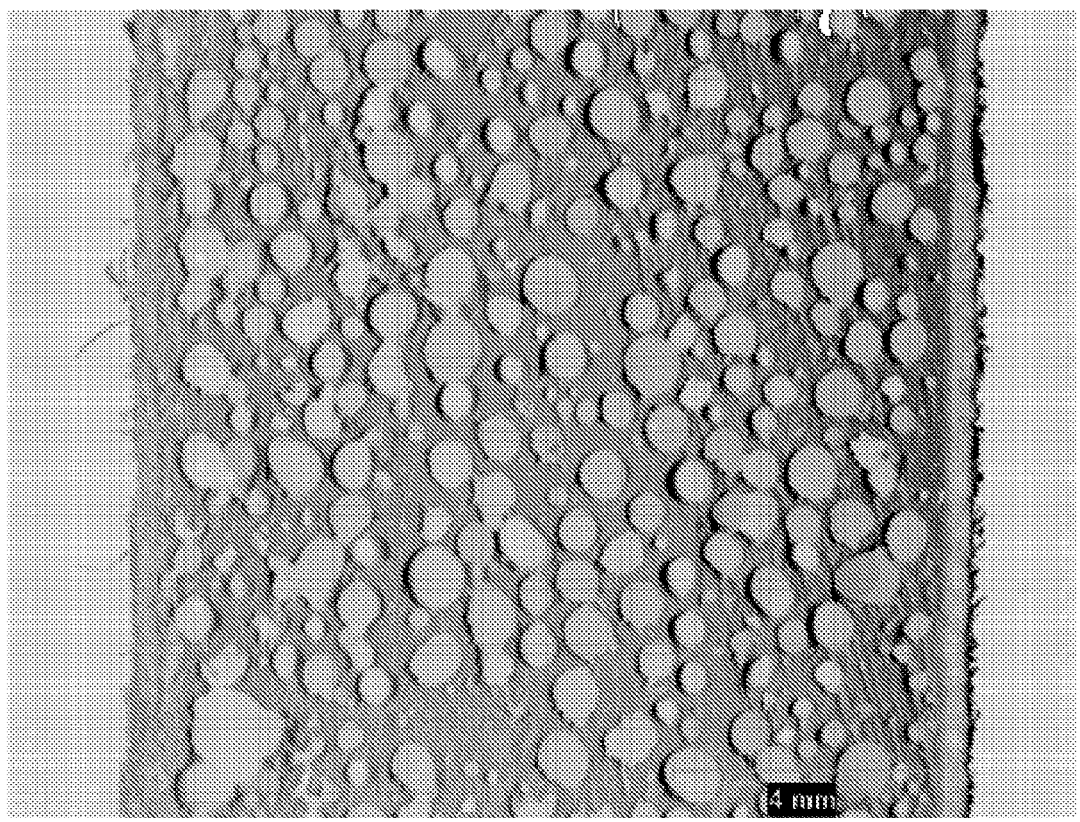
FIG. 6 shows a cross-section of the control sample set forth in Example 2 in accordance with an embodiment of the invention.
Figure 7:
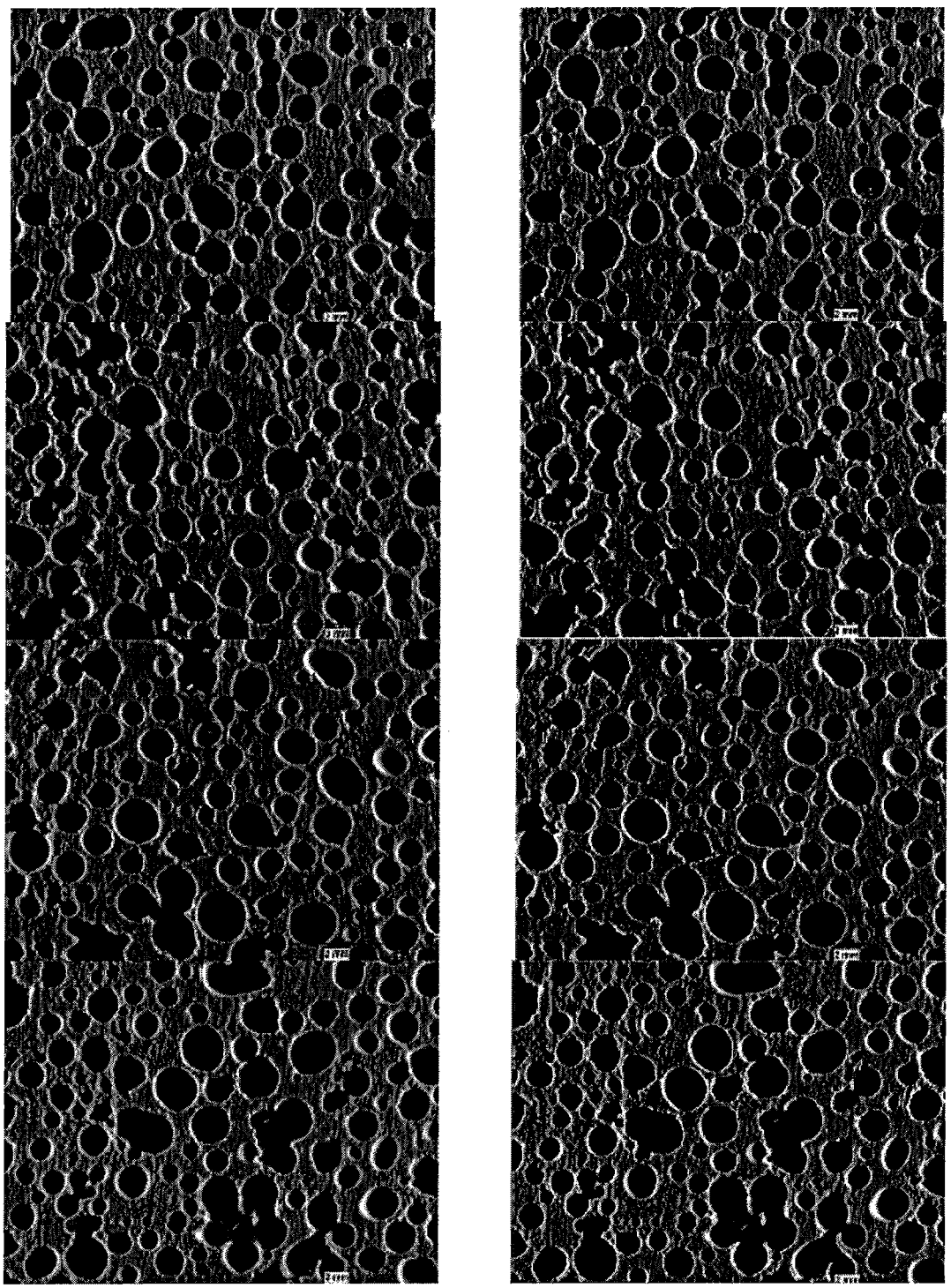
FIG. 7 shows an image analysis routine demonstrating the voids found in the control sample in accordance with an embodiment of the invention.
Figure 8:
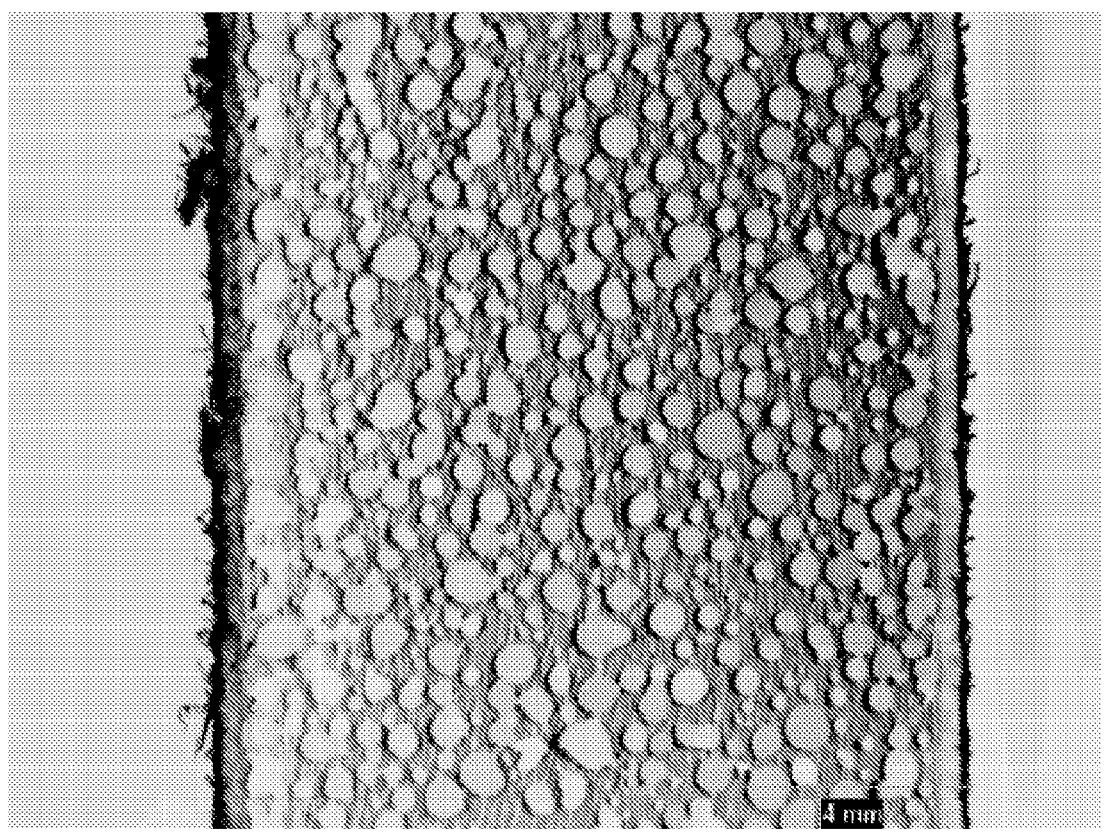
FIG. 8 shows a cross-section of Trial 1C set forth in Example 2, in accordance with an embodiment of the invention.
Figure 9:
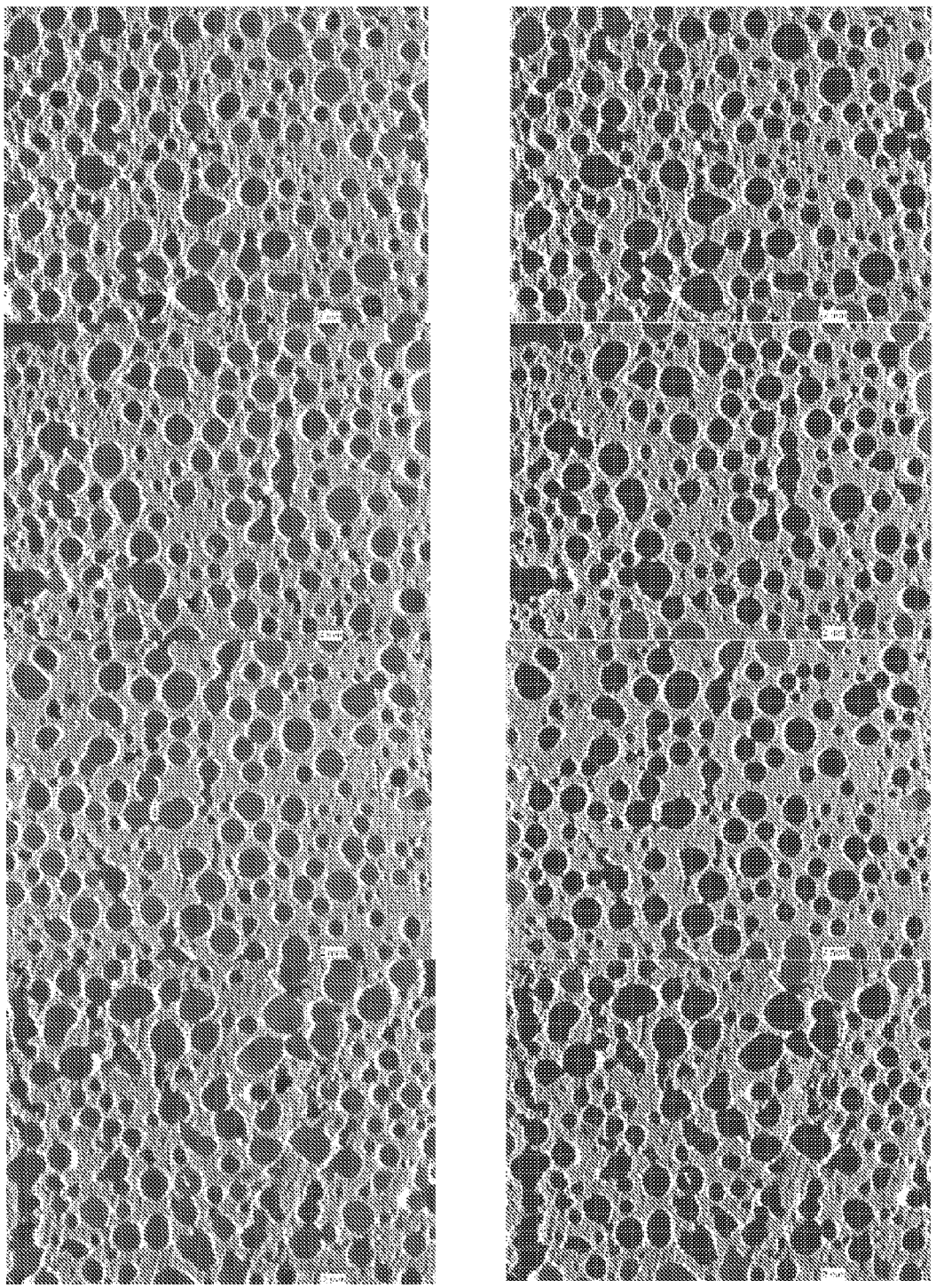
FIG. 9 shows an image analysis routine demonstrating the voids found in Trial 1C, in accordance with an embodiment of the invention.
Figure 10:
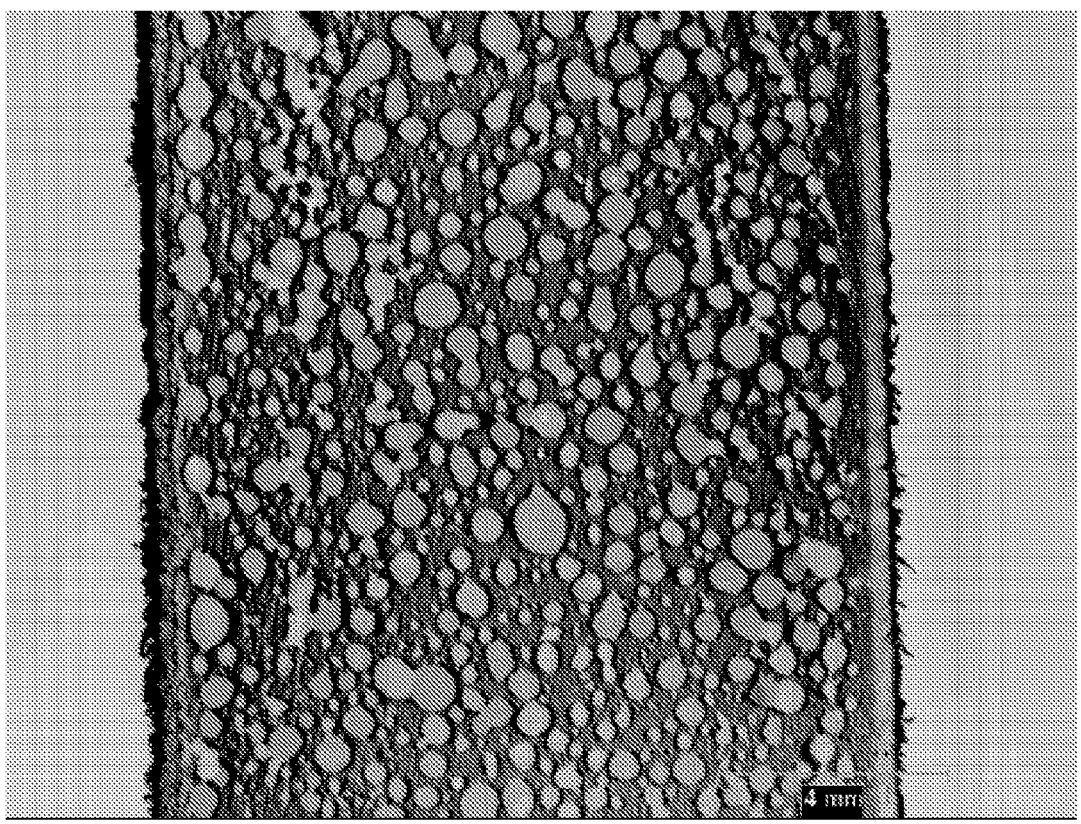
FIG. 10 shows a cross-section of Trial 2C set forth in Example 2, in accordance with an embodiment of the invention.
Figure 11:
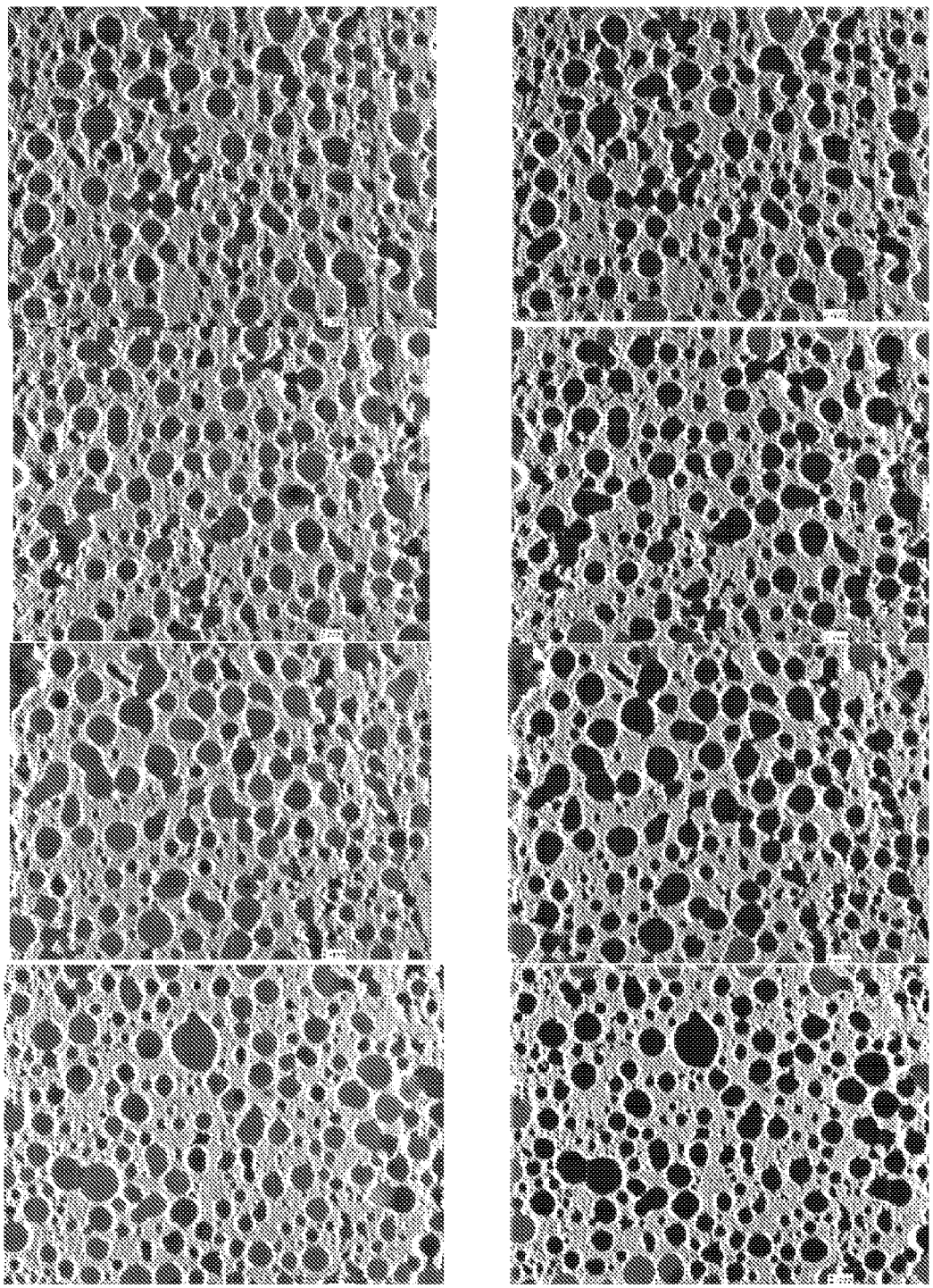
FIG. 11 shows an image analysis routine demonstrating the voids found in Trial 2C, in accordance with an embodiment of the invention.
Figure 12:
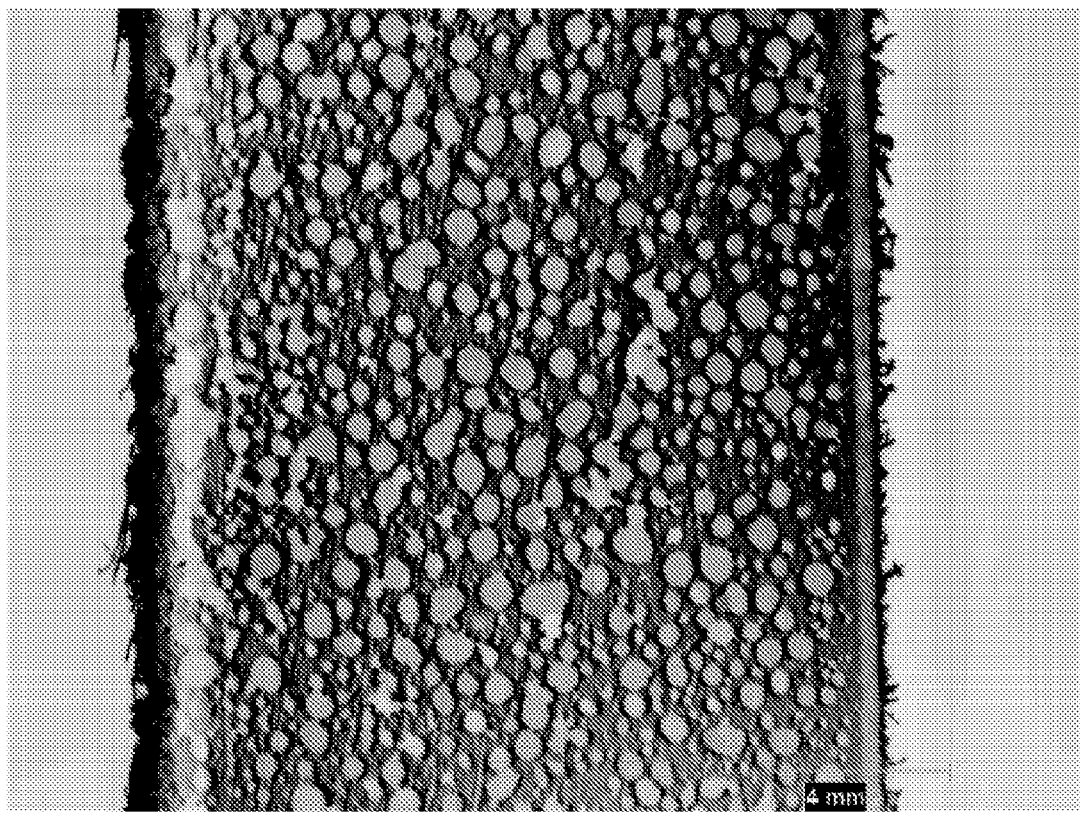
FIG. 12 shows a cross-section of Trial 3C set forth in Example 2, in accordance with an embodiment of the invention.
Figure 13:
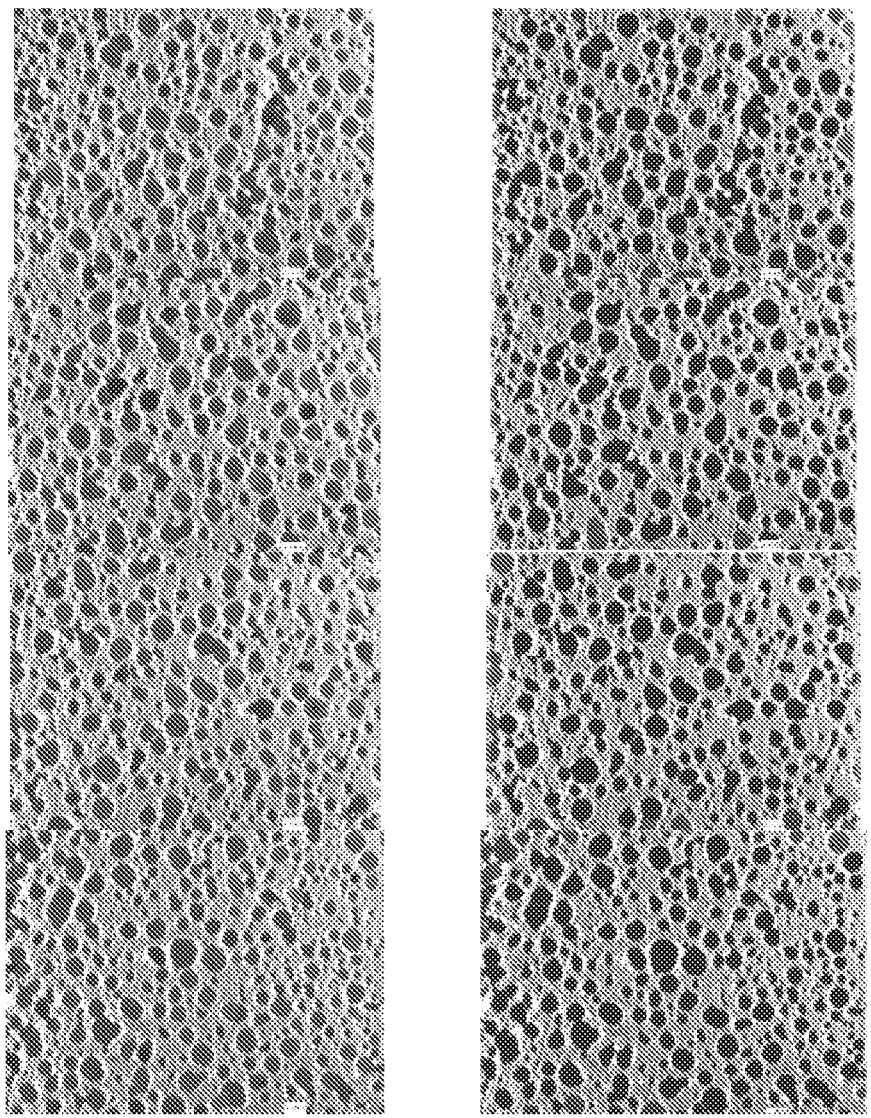
FIG. 13 shows an image analysis routine demonstrating the voids found in Trial 3C, in accordance with an embodiment of the invention.
Figure 14:
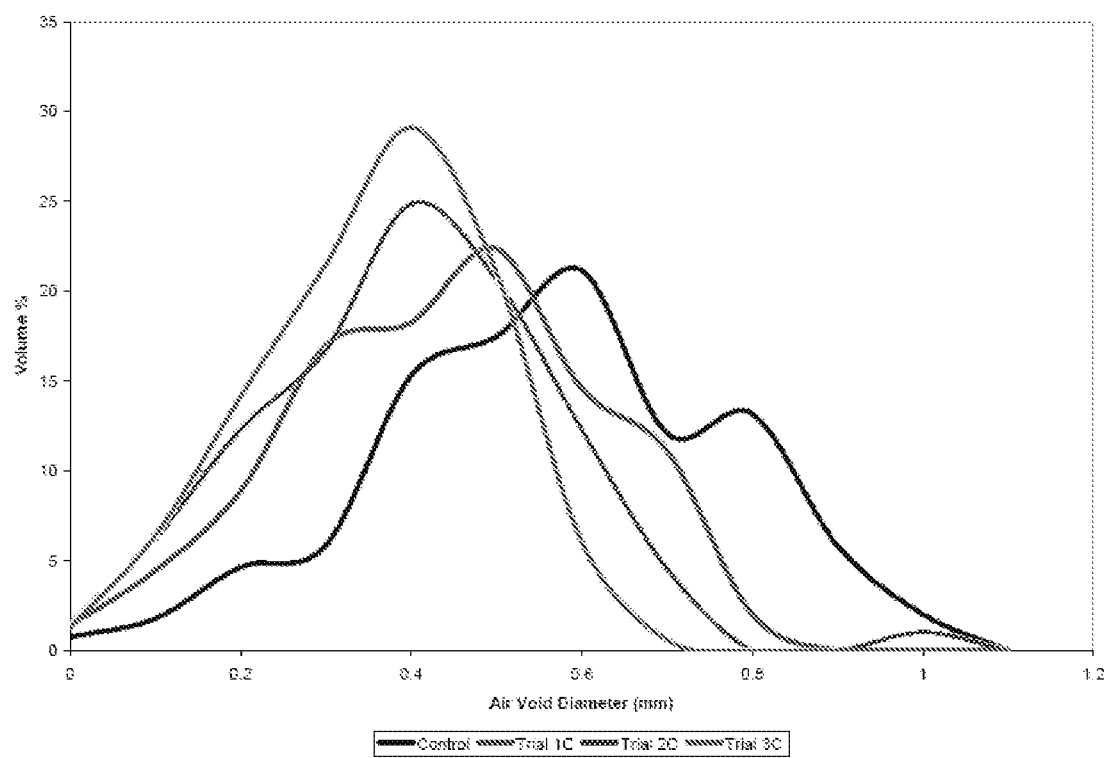
FIG. 14 demonstrates a graph depicting the air void distributions of the four samples of Example 2, showing volume percent as a function of air void diameter (in millimeters), in accordance with an embodiment of the present invention.

The cross-sections analyzed for the control sample is shown in FIG. 6. FIG. 7 demonstrates an image analysis routine of the control sample showing the voids "found." FIG. 8 shows the cross-section of Trial 1C, with the image analysis routine of Trial 1C at FIG. 9. The cross section of Trial 2C is shown at FIG. 10, while the image analysis routine demonstrating the voids "found" is shown at FIG. 11. The cross section of Trial 3C is shown at FIG. 12, while the image analysis routine demonstrating the voids "found" is shown at FIG. 13. FIG. 14 is a chart showing the Air Void Volume % as a function of the air void diameter (measured in millimeters)

While a particular embodiment of the present compositions and methods for stabilizing foam in hard water have been described herein, it will be appreciated by those skilled in the art that changes and modifications may be made thereto without departing from the invention in its broader aspects and as set forth in the following claims.

What is claimed is:

1. A gypsum slurry comprising calcined gypsum, hard water having a minimum of about 80 mg/L calcium and foam generated from blending together at least two alkyl ethoxy sulfate soaps, one of the alkyl ethoxy sulfate soaps in the blend having 3.0 ethoxy groups and being used in an amount from 5% to 35% by weight of the total weight of the soaps; and wherein a distribution of alkyl chain lengths in the blend is about 20% to about 60% $C_8$ chains; about 20% to about 60% $C_{10}$ chains; about 14% to about 36% $C_{12}$ chains and about 2% to about 20% $C_{14}$ chains; wherein the total percentage of $C_{12}$ chains and $C_{14}$ chains is less than 40%.

2. The slurry of claim 1 wherein said blend is a pre-blended soap.

3. The slurry of claim 1, wherein the hard water has from 80 to 120 mg/L calcium.

4. The slurry of claim 1, wherein the hard water has a minimum of 120 mg/L calcium.

5. A gypsum panel formed in the presence of hard water, the panel comprising:
 a calcined gypsum;
 hard water having a minimum of about 80 mg/L calcium to be mixed with the calcined gypsum to form a gypsum slurry;
 a foam added to the gypsum slurry, wherein said foam is formed by combining hard water having a minimum of about 80 mg/L calcium, air and a surfactant, wherein said surfactant is a blend of at least two alkyl ethoxy sulfate soaps, wherein one of the alkyl ethoxy sulfate soaps has 3.0 ethoxy groups and is used in an amount from 5% to 35% by weight of the total weight of the soaps; and wherein a distribution of alkyl chain lengths in the blend is about 20% to about 60% $C_8$ chains; about 20% to about 60% $C_{10}$ chains; about 14% to about 36% $C_{12}$ chains and about 2% to about 20% $C_{14}$ chains, wherein the total percentage of $C_{12}$ chains and $C_{14}$ chains is less than 40%; and wherein said foam is stable in the presence of hard water having a minimum of about 80 mg/L calcium; and a front face and a back face, wherein said foamed gypsum slurry is allowed to set between each of the front and back faces and further wherein once set, the gypsum panel is processed for finishing.

6. The gypsum panel of claim 5 wherein said surfactant is a pre-blended soap.

7. The gypsum panel of claim 5, wherein said gypsum slurry further includes an additive; wherein said additive assists in forming larger foam core bubbles.

8. The gypsum panel of claim 7, wherein said additive includes starches, polycarboxylate ether dispersants, naphthalene sulfonate or mixtures thereof.

9. The gypsum panel of claim 5, wherein the hard water has from 80 to 120 mg/L calcium.

10. The gypsum panel of claim 5, wherein the hard water has a minimum of 120 mg/L calcium.

11. A method for forming a gypsum slurry in the presence of hard water having a minimum of about 80 mg/L calcium, the method comprising the steps of:

mixing a calcined gypsum with hard water having a minimum of about 80 mg/L calcium to form a gypsum slurry; and adding a foam having stability in hard water, wherein said foam includes hard water having a minimum of about 80 mg/L calcium, air and a surfactant, wherein said surfactant is a blend of at least two alkyl ethoxy sulfate soaps, one of the alkyl ethoxy sulfate soaps having 3.0 ethoxy groups and being used in an amount from 5% to 35% by weight of the total weight of the soaps; and wherein a distribution of alkyl chain lengths in the blend is about 20% to about 60% $C_8$ chains; about 20% to about 60% $C_{10}$ chains; about 14% to about 36% $C_{12}$ chains and about 2% to about 20% $C_{14}$ chains; wherein the total percentage of $C_{12}$ chains and $C_{14}$ chains is less than 40%.

12. The method of claim 11, wherein said surfactant is a pre-blended soap.

13. The method of claim 11, wherein forming said gypsum slurry further includes adding an additive; wherein said additive assists in forming larger foam core bubbles.

14. The method of claim 13, wherein said additive includes starches, polycarboxylate ether dispersants, naphthalene sulfonate or mixtures thereof.

15. The method of claim 11, wherein the hard water has from 80 to 120 mg/L calcium.

16. The method of claim 11, wherein the hard water has a minimum of 120 mg/L calcium.

* * * * *